United States Patent
Braudaway et al.

(10) Patent No.: US 6,954,290 B1
(45) Date of Patent: Oct. 11, 2005

(54) METHOD AND APPARATUS TO CORRECT DISTORTION OF DOCUMENT COPIES

(75) Inventors: Gordon W. Braudaway, Yorktown Heights, NY (US); Frank P. Giordano, Scarsdale, NY (US); Marco Martens, Chappaqua, NY (US); Charles P. Tresser, Mamaroneck, NY (US); Chai Wah Wu, Poughquag, NY (US); Charles A. Micchelli, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 09/708,517

(22) Filed: Nov. 9, 2000

(51) Int. Cl.$^7$ .............................................. G06K 15/00
(52) U.S. Cl. ...................... 358/3.26; 358/474; 358/488
(58) Field of Search ................................ 358/452, 474, 358/488, 493, 3.26

(56) References Cited

U.S. PATENT DOCUMENTS

| | | | | |
|---|---|---|---|---|
| 5,497,236 A * | 3/1996 | Wolff et al. | .................. | 358/296 |
| 5,585,926 A * | 12/1996 | Fujii et al. | .................. | 358/471 |
| 5,726,775 A * | 3/1998 | Walsh | .................. | 358/488 |
| 5,760,925 A * | 6/1998 | Saund et al. | .................. | 358/497 |
| 5,764,383 A * | 6/1998 | Saund et al. | .................. | 358/497 |
| 5,808,756 A * | 9/1998 | Matsuda | ..................... | 358/474 |
| 5,835,241 A * | 11/1998 | Saund | ..................... | 358/488 |
| 5,886,342 A * | 3/1999 | Matsui | .................. | 250/208.1 |
| 5,969,829 A * | 10/1999 | Matsuda et al. | ............ | 358/475 |
| 5,995,245 A * | 11/1999 | Moro | ..................... | 358/474 |
| 6,014,470 A * | 1/2000 | Matsuda | ..................... | 382/275 |
| 6,124,950 A * | 9/2000 | Honda | .................. | 358/474 |
| 6,330,050 B1 * | 12/2001 | Takahashi et al. | ............ | 355/25 |
| 6,385,347 B1 * | 5/2002 | Matsuda | ..................... | 382/263 |
| 6,687,420 B1 * | 2/2004 | Matsuda et al. | ............ | 382/286 |

\* cited by examiner

*Primary Examiner*—Thomas D. Lee
(74) *Attorney, Agent, or Firm*—Whitham, Curtis & Christofferson, P.C.; Stephen C. Kaufman (57) ABSTRACT

Pages of books are copied without distortion due to curvature of the page near the book binding or the distortion in a copied page is corrected using the spacing of equidistant bars on tape strips applied to the top and bottom edges of a page before copying. The tape is preferably transparent and rather narrow and easily attached to a page to be copied. The first step in the distortion correction procedure is to locate the bars at the top and bottom of the page. The distortion of the spacing between the imaged bars is computed based on the known distance between the equidistant bars. The computed distortion of the spacing is then input to a distortion correction algorithm. The output of the distortion correction algorithm generates a corrected image. This image may also optionally delete the bars so that they are not printed in the copy. The corrected image is then copied.

9 Claims, 7 Drawing Sheets

METHOD AND APPARATUS TO CORRECT DISTORTION OF DOCUMENT COPIES

BACKGROUND OF THE INVENTION

1. Field of the Invention

The present invention generally relates to improving the quality of copies produced by a document imaging device, and more particularly to a method and apparatus for correcting distortions in copies of pages of a book, journal, or other bound volume.

2. Background Description

Conventional digital copy machines produce copies of pages from a bound volume which are often distorted in the area near the binding. This is because the binding prevents the pages from lying flat against the document glass. More specifically, when a book is opened and a page is placed on the glass, the area of the page near the binding curves away (or upwardly) from the glass surface. As a result, printed information (e.g., text, graphics, etc.) near the binding tends to skew when viewed two-dimensionally by the imaging sensors of the machine. If left uncorrected, the skew will transfer as distortion in the output copy.

In an attempt to reduce distortion, users will often press the book against the document glass to flatten the area near the binding. This approach usually proves less than satisfactory especially when the bound volume is thick. Moreover, pressing the volume against the glass has a tendency to damage the book, requiring its replacement sooner than expected.

Various approaches have been developed to reduce distortion in copies of pages taken from a book. One approach, disclosed in U.S. Pat. No. 5,831,750, uses a plurality of charge-coupled device (CCD) sensors to measure the height of the page from various perspectives. The amount of light reflected from the page at each sensor position is used to form a height distribution curve which a processor relies on to correct distortion by adjusting an autofocus function. U.S. Pat. No. 5,808,756 also discloses a which corrects distortion based on page height measurements.

Another approach, disclosed in U.S. Pat. No. 5,835,241, captures two images of a page, a first is taken while a light pattern is projected on the page and a second taken without projection of the light pattern. Using pixels corresponding to the light pattern in the first image, a crease is identified representing the spine of the book. The pixels forming the crease are replaced with ones determined using a parametric model that approximates the spine region. Finally, the second image is de-warped using various transform functions, resulting in the correction of distortion caused by the page curving away from the document platen. U.S. Pat. No. 5,084,611 also discloses an image correction method that uses projected light patterns.

Another approach, disclosed in U.S. Pat. No. 5,497,236, corrects distortion caused by page curvature by fitting lines of text in an unsplayed portion of the page image to a skew line which represents deviation of lines of text in the image from a horizontal reference. Splay is then determined for each line of text, an inverse transformation is performed to straighten the text lines, and horizontal stretching is applied to correct for the projection angle of the original document.

Another approach, disclosed in U.S. Pat. No. 5,818,976, involves examining distortion of the edges of a page. This is accomplished using a background with optical characteristics that contrast with those of the page. Specifically, the page and background are scanned and transitions in the image are detected which define points along one or more of the page edges. A skew angle is then established between the detected edges and a reference orientation, and the image is modified until the resultant skew angle is substantially zero.

The conventional approaches mentioned above require complicated hardware for performing distortion correction. U.S. Pat. Nos. 5,831,750 and 5,808,756 require the use of special equipment for taking height measurements; U.S. Pat. No. 5,835,241 require the projection of light patterns onto the page; and U.S. Pat. No. 5,084,611 uses a two-stage process and an additional light source for detecting the curvature of the page. The approach taken in U.S. Pat. No. 5,497,236 determines splay solely from horizontal lines of text, which could be difficult for non-text documents or documents with many different fonts, diagrams, and non-traditional layouts. The approach disclosed in U.S. Pat. No. 5,818,976 estimates only the edge of a page, which is not representative of the distortion of the page in many cases.

From the foregoing discussion, it is clear that conventional distortion correction approaches have proved less than optimal. A need therefore exists for an improved method of correcting distortion in scanned documents, especially those taken from bound volumes of substantial sizes and thicknesses.

SUMMARY OF THE INVENTION

It is an objective of the present invention to provide an improved method for correcting distortion in scanned images of pages in a bound volume before that image is output to a user.

It is another objective of the method of the present invention to correct distortion in copied documents without the expense of costly hardware added to the copy machine.

It is another objective of the method of the present invention to allow for other post-processing of documents copies or produced using simple and inexpensive means.

It is another objective of the method of the present invention to correct distortion without using complicated or specialized hardware as is the case with copiers that employ conventional distortion correction techniques.

According to the invention, there is provided a tape of sticking paper marked with equidistant lines, called bars, along the length of the tape. The tape is preferably transparent and rather narrow. The tape is easily attached (in one or more strips) to a page to be copied, parallel (or about) to lower and upper boundaries, preferably at a place(s) (e.g., close to the boundary(ies)) where it does not obstruct (too much of) the text or images. This tape can remain on the page permanently or can be detached easily after use, depending on the choice of quality, which in turn will determine the kind of use one intends. Optionally, the bars can be printed on the page by the printer or publisher of the volume to eliminate the need for strips altogether.

In the case a page is copied using a classical copy machine, not equipped with any distortion device, the bars will appear on the copy but will not be equidistant, and possibly not exactly aligned. Nevertheless, they will be (quasi) equidistant and aligned near the outer boundary of the page (by which we mean the portion of the page copied from the outer boundary of the book or the like). Thus, the bars collection can be easily recognizable using specialized software, which can be equipped in some other copy machine or some other computation device. A further processing of the page copies with distortion by such a machine then allows obtaining much better copies. If the tape is not placed exactly parallel to the bottom of the page, this will be easily recognized by inspection of the outer part of the set of bars and can be corrected by the software. In the case a page is copied using a copy machine equipped with such specialized software, the correction of the distortion can be made at the first print. Since the software allows for recognition of the bars, one may choose to avoid displaying a copy of the bars on the copy. This is easily done since the specialized software recognizes the collection of bars.

The present invention improves upon conventional copiers by the use of add-on reference marks to documents which is effective in all types of documents (including non-text documents) in terms of providing accurate information about distortion of the page. Further, distortion detection and correction in accordance with the invention does not require the copier to include specialized, complicated hardware such as height measurement devices, light pattern projectors, and scanners which conventional systems require. Instead, in at least one embodiment, the method of the present invention is implemented entirely in software. In another embodiment, the only additional hardware that may be used is an ultraviolet light source.

A further advantage is that the method can be performed without having the full page or all the page boundaries appearing in the field of view of the copy machine.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is, in one respect, a method for correcting distortion in an image of a document with one or more curved areas which have been optically scanned by a copy machine, facsimile machine, personal computer scanner, or any other type of digital imaging device. The method is particularly well suited to correcting three-dimensional skew effects in images of pages taken from a book, magazine, journal, or other bound volume of substantial thickness; however, those skilled in the art can appreciate that the invention may be applied to a book of any size or even a single page which has curves along its sides or even in its interior portions that occurred, for example, as a result of bending, folding, or warping. The present invention is, in a second respect, a digital imaging device incorporating a processing unit that implements the method of the present invention.

Figure 1:
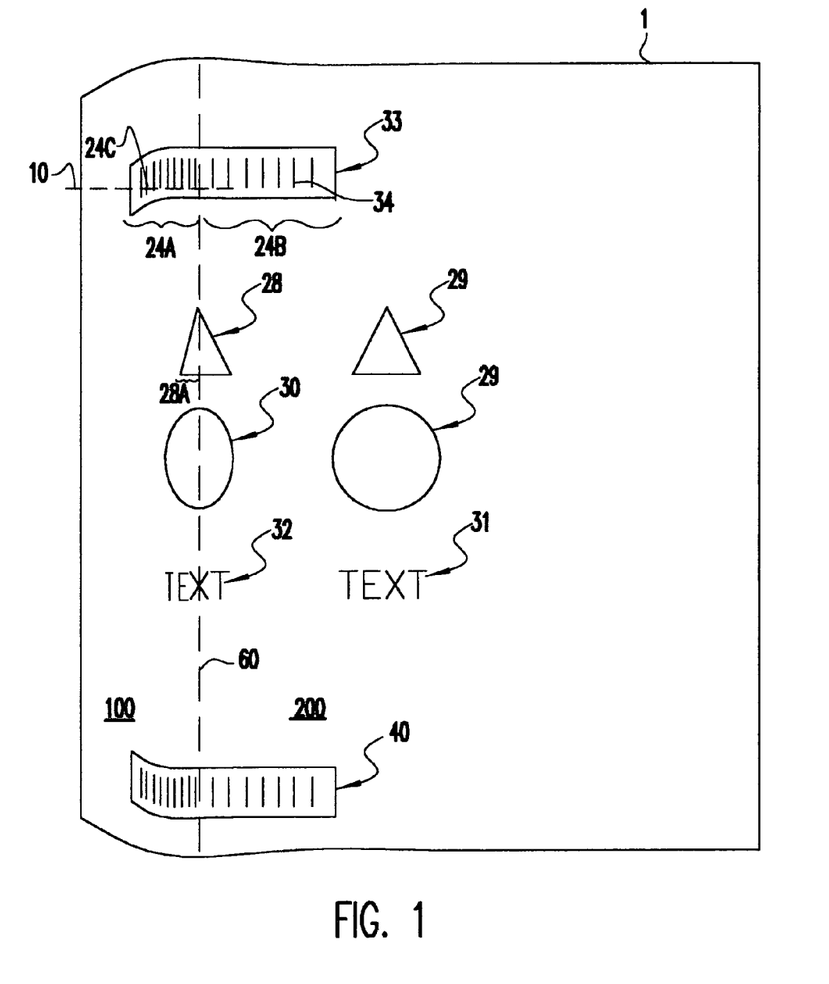
FIG. 1 is an illustration of a book page as viewed two-dimensionally by the imaging sensors of a digital imaging device, which two-dimensional view corresponds to an image bitmap containing strip patterns used in accordance with the present invention.

Turning now to the specific embodiments, a page 1 of a book viewed two-dimensionally (e.g., in a bitmap image) by a digital imaging device when placed on a platen is shown in FIG. 1. As shown, the page contains distortion resulting from the curvature of the page in the area of the book binding. The distortion appears in the form of a skew of geometrical shapes and text in an affected area of the page. Triangle 28, circle 30, and text 32 are located in an area 100 curved by the binding at the time of scanning, and triangle 27, circle 29, and text 31 are located in an area 200 lying outside the binding area, i.e., an area corresponding to a place where the book page lies flat against the document glass.

Since triangle 27 and circle 29 are on a portion of the page lying flat on the glass, they appear without distortion in the two-dimensional scanned image. However, triangle 28 and circle 30, which are located in the binding area, are distorted. This distortion is evident by comparing the shapes and text in the binding and non-binding areas. For example, triangle 27 in the non-binding area is an equilateral triangle as it appeared on the book page. The curvature of the binding, however, causes triangle 28 to become skewed (compressed) in the area 28a so that it no longer resembles an equilateral triangle. Similarly, the shape of circle 30 is skewed to appear more elliptical and the letters "T" and "E" in text 32 are compressed relative to the width and spacing of the remaining letters of text 30 and text 31. As described below, the method and apparatus of the present invention corrects distortion effects of the type shown in FIG. 1.

Figure 2:
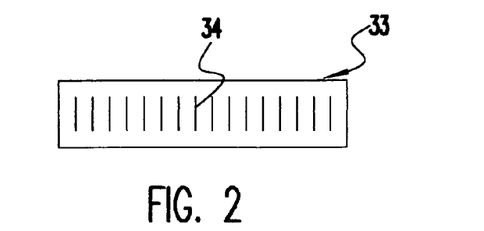
FIG. 2 is a diagram of a strip containing an exemplary reference pattern used in accordance with the present invention.

Referring to FIG. 2, in accordance with the method of the present invention, correction of distortion effects is achieved by attaching a strip of material 33 containing reference markings 34 to the page to be scanned. The strip may be a paper tape, a transparent sheet of plastic, or any other material capable of bearing reference markings detectable by an optical scanner. Preferably, a back portion of the strip contains an adhesive (not shown), however those skilled in the art can appreciate that any other form of attachment may be used including, for example, paper clips and staples. If an adhesive is used, it is preferably one which removably attaches strip 33 to the page such as the type used, for example, by 3M Company's Post-It Notes® product.

The size of strip 33 may vary, however in order to prevent the content of the page from being obscured it is preferable to make the strip as small as possible, e.g., one-quarter to one-eighth of an inch wide. So that the strip may serve as a reference, in a manner that will be described in greater detail below, the length of the strip must be long enough to extend from the binding area where distortion effects are expected to occur into a non-binding area where no distortion occurs. (If the page to be scanned has folds, warps, or bends in areas other than along its edges, e.g., in its interior portions, the strip may be attached to the page so that a portion of the strip corresponds to the folded, warped, or bent area along at least dimension of the page and another portion does not.)

The reference markings 34 on the strip may be of any shape and size provided they are clearly readable by an optical scanner and are in a pattern which can serve as a reference for determining an amount of skew along at least one direction (or axis) caused by curvature of the binding (or folded) area. One illustrative set of markings, shown in FIG. 2, includes a series of opaque vertical bars having a predetermined spatial relationship. This relationship may include the bars being in a regular pattern such as equidistant from one another.

The amount and direction of skew in the binding area may be determined by the distortion that occurs in the reference markings on strip 33. As shown in FIG. 1, for example, strip 33 containing bar pattern 34 has been attached to an upper portion of the page so that part of the bar pattern resides within the binding area 100 and part resides in the non-binding area 200. In the scanned image, the part of the bar pattern in the binding area, 24*a*, is distorted in two directions but the part of the bar pattern in the non-binding area, 24*b*, is not.

Distortion of the bar pattern in a first direction occurs along a horizontal axis passing through the pattern, i.e., along an axis which is at least substantially parallel to an upper edge of the page. This distortion, or skew, appears in the form of a compression of the bar pattern in the binding area. This is evident from the spacing of the bars 24*a* being closer than the spacing of the bars 24*b*. The difference in these spacings provides an indication of the amount of skewing that the binding has produced in the horizontal direction.

Distortion of the bar pattern in a second direction occurs along a vertical axis passing through the pattern, i.e., along an axis which is at least substantially parallel to a side edge of the page. This distortion, or skew, appears in the form of the leftmost bars 24*c* curving either upward or downward relative to the bars in the non-binding area. The degree to which the bars curve upward or downward relative to the bars in the non-binding area provides an indication of the amount of skewing caused by the binding in the vertical direction.

The amount of skewing of the bar pattern in the horizontal and vertical directions serves as a basis upon which a digital signal processor of the present invention may rely to correct the distortion in the image of the scanned page. (It is noted that skew along both directions is not required. Rather, the invention can detect and correct distortion if skew occurs in only one direction.) The manner in which skew distortion correction is effected by the present invention is described in greater detail below.

Figure 3:
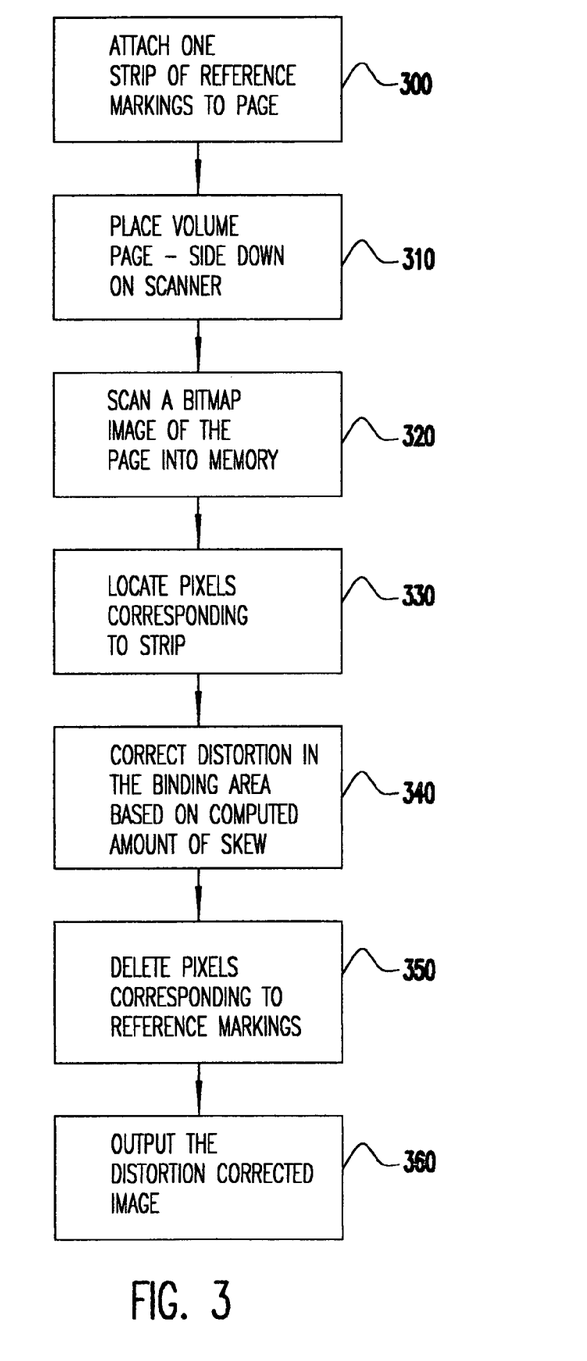
FIG. 3 is a flow diagram showing steps included in a first preferred embodiment of the method of the present invention.

Referring to FIG. 3, a first preferred embodiment of the method of the present invention begins by having a user attach a single strip of reference markings at a predetermined location and orientation onto a page of a volume to be scanned. (Block 300). The strip may be attached in any location provided a portion of the reference markings reside within a binding area (or other area where distortion may be expected to occur, such as internal portions containing warped, bent, or folded portions). So as not to obscure the content of the page, the strip is preferably attached either at a top or bottom portion of the page, as depicted in FIG. 1.

Figure 4:
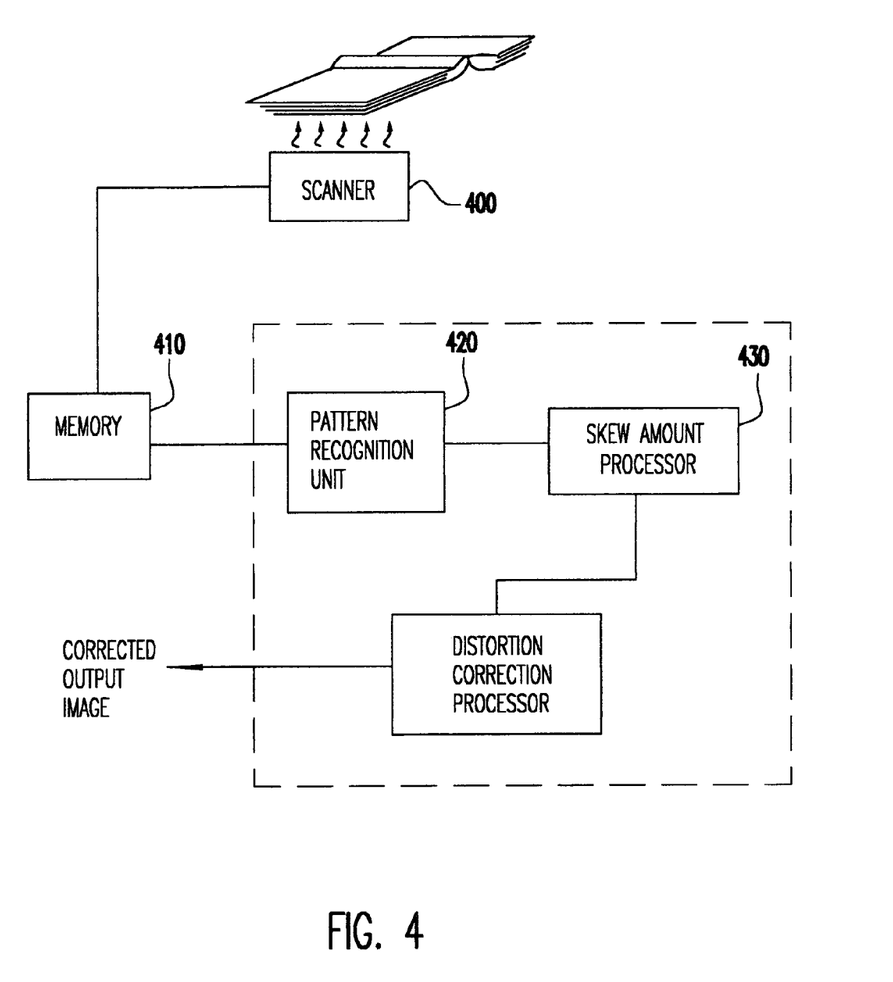
FIG. 4 is a functional block diagram of a digital imaging device in accordance with the present invention.

Once attached, a user places the volume, page side down, on the glass of a scanner 400, see FIG. 4, so that the strip will come within a field of view of the scanner's optical sensors. (Block 310). The user then pushes a button to cause the page to be scanned and a bitmap image thereof placed into a memory 410 of the device. (Block 320).

Next, a pattern recognition unit 420 locates the pattern of pixels corresponding to the strip in the bitmap image stored in memory 410. (Block 330). This is accomplished in accordance with a control program that causes unit 420 to detect the specific reference markings on the strip from all the other printed information on the scanned page. For example, unit 420 may be programmed to reference a specific location in the bitmap to locate the pattern. Alternatively, unit 420 may examine the entire bitmap to locate a random placement of the pattern therein. Preferably, tolerances are built into the control program to allow unit 420 to locate the pattern regardless of its orientation. As a result, even if the strip is not attached exactly parallel to the top edge of the scanned page, unit 420 will be able to locate the pattern. If desired, software can be used to cause unit 420 to recognize the bar pattern by their vertical location on the page and/or by their mutual placement as most pages to be copied do not carry such sets of parallel bars. Recognition of the reference pattern on the strip may be performed by unit 420 based on the approach taken in U.S. Pat. No. 5,835,241, the contents of which are incorporated herein by reference.

If, in searching for the pattern, unit 420 locates the same or similar pattern in the content of the scanned page, unit 420 may be programmed to discriminate between these patterns to identify the bit sequence that corresponds to the pattern scanned from this strip. Because the strip is attached at or close to the upper and/or lower edge of the page, unit 420 is able to perform this discrimination function (i.e., to distinguish between patterns on the page and patterns on the strip) by picking the pattern closest to the upper and/or lower edge of the page. Given the detected image of the strip, the entire image is dewarped such that the image of the strip returns to its original shape. Key points on the detected image of the strip and on the original image of the strip may be used as reference points for dewarping. Methods of dewarping images are known to those skilled in the art. See, for example, the Image Processing Handbook, by John C. Russ, IEEE Press. This method may also be used when more than one strip is used.

Once the amount of skew is determined in the horizontal and vertical directions, distortion correction processor 440 modifies the bitmap image in memory 410 based on the amount of skew computed by skew amount processor 430 to correct the distortion in the binding area. (Block 340). Thus, after the distortion in the horizontal direction is detected and corrected as discussed above, the distortion in the vertical direction is determined by the shape of the detected image of the strip and dewarped using standing dewarping techniques such as disclosed in the Image Processing Handbook by Russ.

When several strips are used, the image is divided into bands, with each band containing one strip. The above method can then correct for each band based on the corresponding strip. For the area near the boundary of the bands, an averaging of the distortion correction functions of the neighboring bands may be performed to give a smooth output.

Before bitmap correction has been effected, distortion correction processor 440 deletes the pixels in the bitmap image corresponding to the reference markings, so that the reference markings will not appear in the output image. (Block 350).

Finally, the corrected bitmap image is printed out, if the digital imaging device is a copier, transmitted through telephone lines if the device is a facsimile machine, or stored in memory or displayed if the device is a personal computer. (Block 360).

The steps which distortion correction processor 440 may perform to correct distortion effects in the scanned page are conceptually described above. A specific approach which bitmap processor 440 may take to perform this correction will now be described.

In this approach, it is assumed that the distortion detected from analysis of the strip markings is uniform down the length of the page. The following method corrects skew in one dimension. After the skew is determined in both the horizontal and vertical dimensions, the method is applied to each dimension in turn. Within the bitmap, distorted pixel values are represented $g_n=g(nT)$, with $n=0, 1, \ldots N$. The spatial deviations in the strip markings then provide an indication of the pixel locations $m_1, m_2 \ldots m_k$ at which k markers are placed are distorted to locations $n_1, n_2, \ldots n_k$. Thus, the values $g_l=g(n_1T)$ where $l=1, 2, \ldots k$ should be undistorted to locations $m_1, m_2, \ldots m_k$. Processor 430 then constructs the undistorted pixel values $f_n=f(nT)$, with $n=0, 1, \ldots N$ from this information.

To do so, we set $f_{ml}=g_l$, where $l=1, 2, \ldots k$, and then seek to find $f_n$, $n$ $I\{m_1, m_2, \ldots m_k\}$. This is found by employing reparameterization of the distortion curve. Thus, the choice of f is $f(t)=g(h, (t))$, where t is a real number and h is the reparameterization function constructed so that $h(m_l)=n_l$, where $l=1, \ldots k$. This set of conditions ensures that $f_{ml}=g_l$, where $l=1, \ldots k$ as required.

Given the reparameterization function h, values of $f_0, f_1, \ldots f_N$ are created in accordance with the following steps. First, points $g_l=g(n_1T)$ where $l=1, 2, \ldots k$ are interpolated and extrapolated to a function g(t) defined for all or a reasonably large subinterval of real numbers. The interpolation/extrapolation method used may be linear interpolation/extrapolation or spline methods, some of which are described below for illustration purposes. Then, $f_n$ is evaluated as g(h(nT)).

With this technique, the reparameterization function h is now constructed subject to the interpolation conditions $h(m_l)=n_l$, where $l=1, 2, \ldots k$. The reparameterization is preferably "local," that is, h(t) should depend only on the markers "near" it. Moreover, reparameterization should be "smooth," having at least one continuous derivative. Moreover, reparameterization should be fast and numerically stable to implement. All of these objectives may be achieved by spline functions. Two exemplary spline methods that may be implemented in accordance with the invention are discussed below, however those skilled in the art that other spline methods may just as easily be used.

The first spline method is based on techniques described in the article by W. Dahmen, C. A. Micchelli, and T. N. T. Goodman entitled "Compactly Supported Fundamental Functions for Spline Interpolation," Numerische Mathematik, 52 (1988), pages 639–664. According to this method, the following function is chosen:

$$h(t) = \sum_{l=1}^{k} n_l L_l(t)$$

where $L_1, \ldots L_k$ are chosen so that $L_r(m_p)=\delta_{rp}$, where $s=1, \ldots k$ Each $L_r$ is constructed in the same way. The properties defining $L_r$ uniquely are as follows. An explicit formula is gen for $L_r$ such as disclosed in the Dahmen article. The properties include:

A: $L_r \in C^1(\mathbb{R})$
B: $L_r(t)=0$, $t \in [m_{r-2}, m_{r+2}]$
C: $L_r(m_s)=0$, $s=r-2, r-1, r+1, r+2$
D: $L_r(m_r)=1$ E: $L_r$ is a quadratic polynomial on every interval $[t_s, t_{s+1}]$ wherein the points $t_s$ are defined by $t_{2s}, =m_s$ and $t_{2s+1}=(m_s+m_{s+1})/2$.

For the implementation of this method, two "ghost" pixel locations must be inserted to the left of $m_1$ and two more "ghosts" must be inserted to the right of $m_k$. These ghosts will affect only the construction of $L_1, L_2, L_{k-1}$, and $L_k$. This reparameterization has all the desired properties for accomplishing the bitmap correction of skew contemplated by the present invention, but does not represent the only reparameterization for implementing the invention.

A second method spline method reconstructs reparameterization function h by incorporating the hypothesis that the distortion occurs monotonically, that is, if $m_1<m_2<\ldots <m_k$, then $n_1<n_2<\ldots <n_k$. In this case, h is constructed to be strictly increasing. On way to accomplish this is to use the results described in the article F. N. Fritsch, F. N. Carlson, R. E. Carlson entitled "Monotone Piecewise Cubic Interpolation," SIAM J. Numer. Anal. 17 (1980), pages 238–246. In accordance with this technique, h is made a cubic polynomial on each interval $[m_r, m_{r+1}]$, where $r=1, 2, \ldots k-1$. The "pieces" of h are joined together so that $h \in C^1(\mathbb{R})$. Then, the values of $h'(m_r)$ are used to control its "shape." There are several effective methods which may be used to choose these slopes. One exemplary method which may be used is disclosed in the above-referenced Fritsch ariticle and another is disclosed in the article by A. Edelman and C. A. Miccelli entitled "Admissible Slopes for Monotone and Convex Interpolation," Numerische Mathematik, 51 (1987), pages 441–458. These aforementioned methods provide an effective way to correct distortion across a scanned page.

Figure 5:
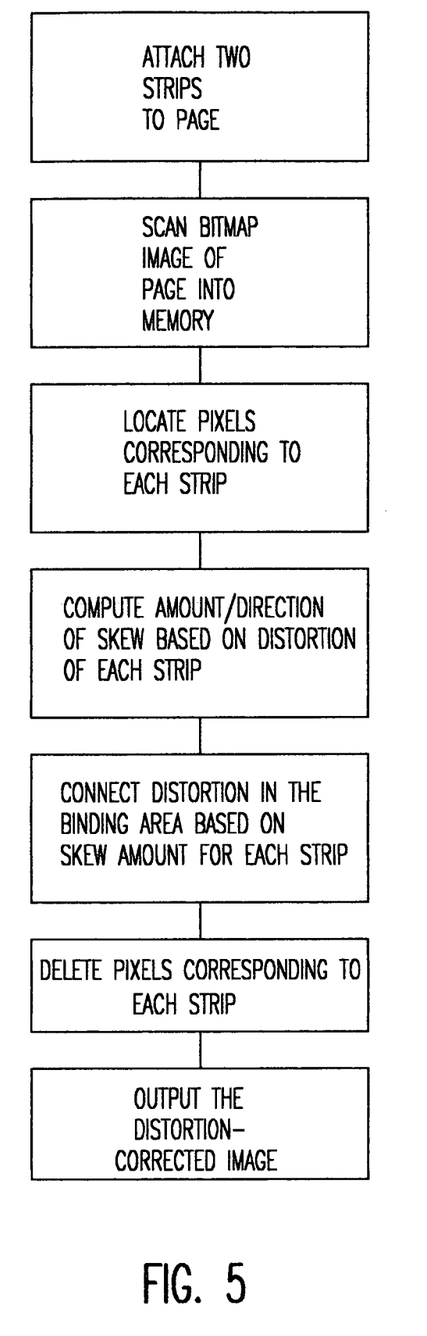
FIG. 5 is a flow diagram showing steps included in a second preferred embodiment of the method of the present invention.

Referring to FIG. 5, a preferred second embodiment of the method of the present invention includes steps similar to the first embodiment except two strips of reference markings are attached at different locations on a page to be scanned, with the reference markings of both strips partially extending into an area of the page where binding distortion may be expected to occur. Preferably, the strips contain the same reference markings, although the control program for pattern recognition unit 420 may be written to recognize different patterns on the strips if desired. Exemplary placement of these strips, 33 and 40, are shown in FIG. 1 as being at the top and bottom of the page, respectively, and preferably at locations which do not obscure the content of the page.

To correct distortion when two strips are used, skew amount processor 430 computes the amount of distortion based on the skew of each strip. Distortion correction processor 440 then corrects the bitmap image based on the skew amount determined for each strip output from the skew amount processor.

In the foregoing embodiments, it is preferable that the splay correction function be turned off. One can also use the present invention in an obvious way to measure distortions of a copier which would not necessarily be induced by a lack of flatness of the page to be copied. One such type of distortion is, for instance, caused stretching of the paper to be copied.

Figure 6:
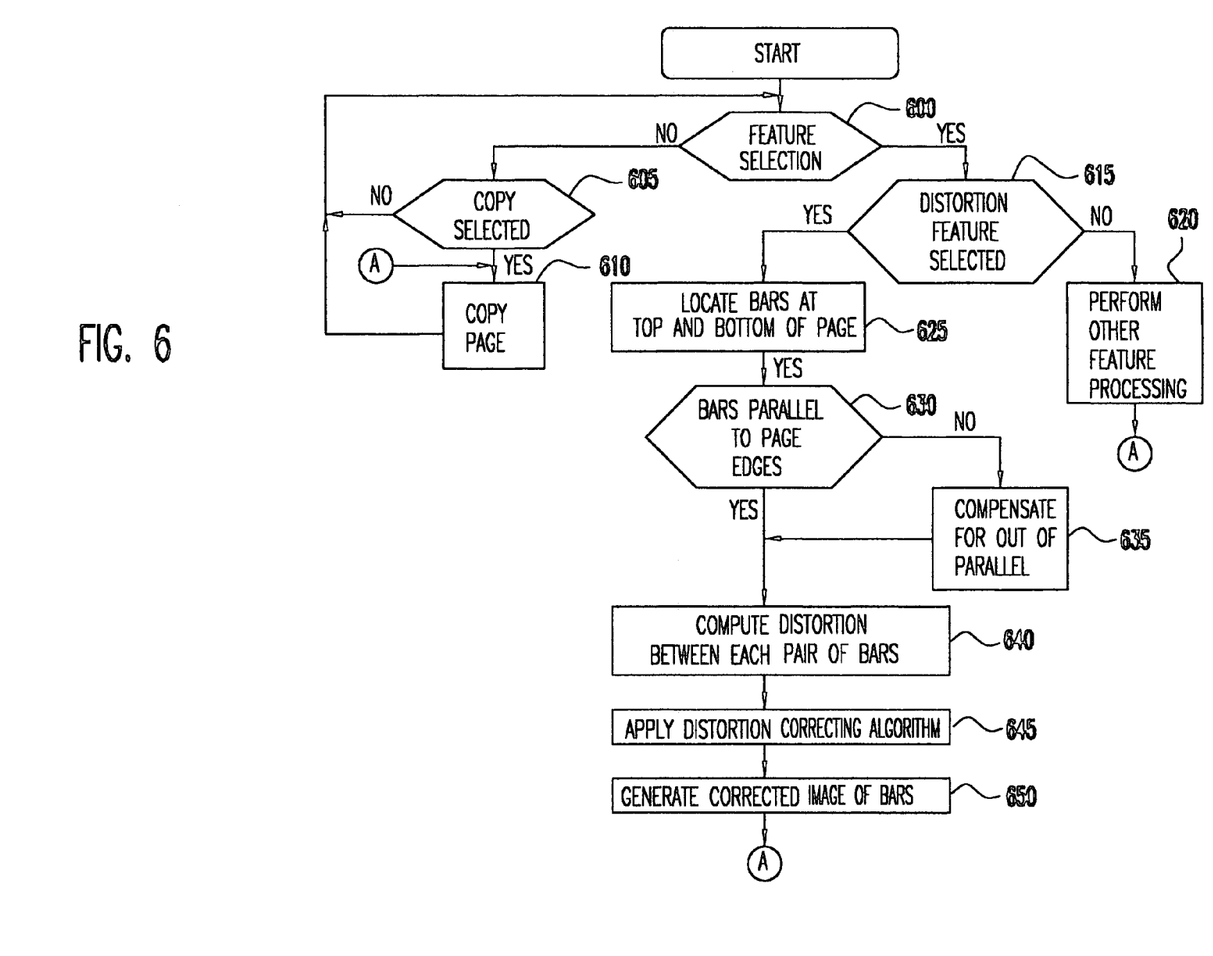
FIG. 6 is a flow diagram showing steps performed by another embodiment of the method of the present invention implemented on a digital copier.

Referring to FIG. 6, a flow diagram describing another embodiment of the method of the present invention as implemented in a copy machine begins after the copy machine has warmed up and provides a selection menu of features from which a user can optionally make a selection. Standard features commonly available in copy machines include enlargement and reduction, double sided copying, multiple copies with and without collating, and stapling. The invention adds to this selection a distortion correction feature. A determination is made in decision block 600 to determine if a specific feature has been selected by the user. If not, a determination is made in decision block 605 to determine if the user has pressed the "copy" button, and if so, a copy of the page is made in function block 610. If no feature has been selected and the "copy" button has not been pressed by the user, the machine waits in an idle mode, as illustrated by the process looping back to input of decision block 600. After a copy is made, the machine returns to this idle mode.

Assuming now that a feature has been selected by the user, a test is made in decision block 615 to determine if the feature selected is the new distortion correction feature according to the present invention. If not, the other feature processing selected is performed in function block 620 and then the process goes to function block 610 where the copy is made after the feature processing is completed. Thus, if double sided copying is selected, the copy machine manipulates the page to copy the first side of the page and then the other side of the page.

Assuming that the distortion correction feature according to the present invention is selected, the method continues by locating the bars at the top and bottom of the page in function block 625. These bars correspond to the lines on strips 33 and 40 shown in FIG. 1. A test is made in decision block 630 to determine if the strips with the bars are parallel to the page edges. If not, a compensation routine is called in function block 635 to compensate for the tape strips being applied out of parallel.

At this point, the distortion of the spacing between the imaged bars is computed in function block 640 based on the known distance between the equidistant bars. The computed distortion of the spacing is then input to a distortion correction algorithm in function block 645. The output of the distortion correction algorithm generates a corrected image in function block 650. This image may also optionally delete the bars so that they are not printed in the copy. The corrected image is then copied at function block 610, and the machine then returns to its idle state. The steps performed by function blocks 640, 645, and 650 may be in accordance with the steps in any of the previously described embodiments.

In the case a page is copied using a classical copy machine, not equipped with any distortion device, the bars will appear on the copy but will not be equidistant, and possibly not exactly aligned. Nevertheless, they will be (quasi) equidistant and aligned near the outer boundary of the page (by which we mean the portion of the page copies from the outer boundary of the book or the like). Thus, the bars collection can be easily recognizable using specialized software, which can be equipped in some other copy machine or some other computation device. A further processing of the page copies with distortion by such a machine then allows obtaining much better copies. Notice also that if the strip is not placed exactly parallel to the bottom of the page, this will be easily recognized by inspection of the outer part of the set of bars and can be corrected by the software.

In the case a page is copied using a copy machine equipped with such specialized software, the correction of the distortion can be made at the first print. Since the software allows for recognition of the bars, one may choose to avoid displaying a copy of the bars on the copy. This is easily done since the specialized software recognizes the collection of bars.

Figure 7:
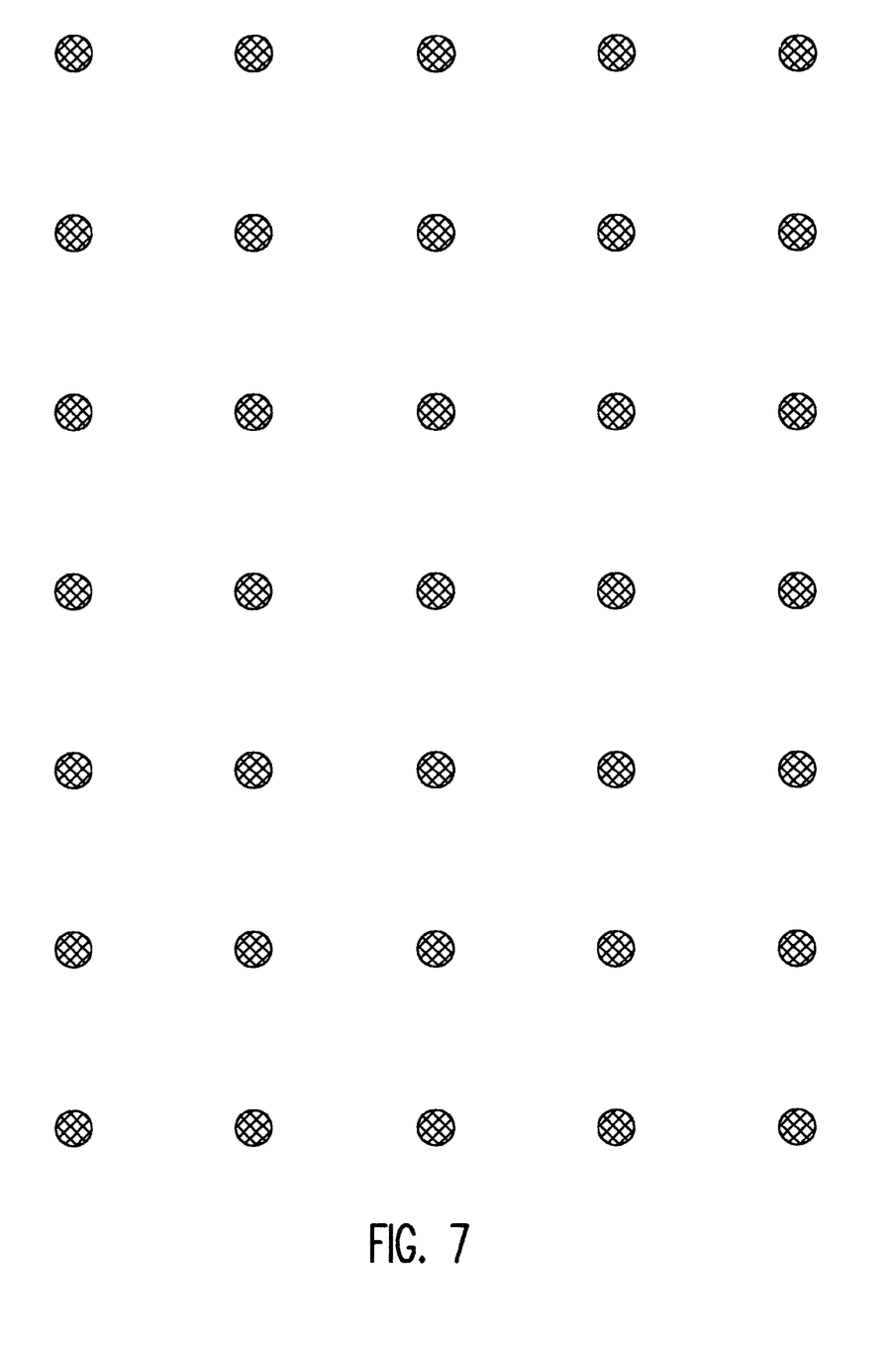
FIG. 7 is a diagram of a grid of reference marks spanning the entire dimensions of a page used in accordance with another embodiment of the present invention.

In another embodiment, the reference marks are included within a grid spanning the entire dimensions of the page, as shown in FIG. 7. This grid may be detected by the distortion correction software before being printed. Alternatively, the grid (or reference marks) may be applied using ink which is only visible under ultraviolet light. In this case, the copier would have an additional ultraviolet light source which illuminates the page to obtain a scanned image of the grid plus the printed text which is then subtracted from the scanned image using ordinary light to obtain a scanned image of just the grid. This information is then used to determine the distortion.

The steps of detecting the pattern from the strip is similar to the steps used to detect alignment marks in printing applications.

Figure 8:
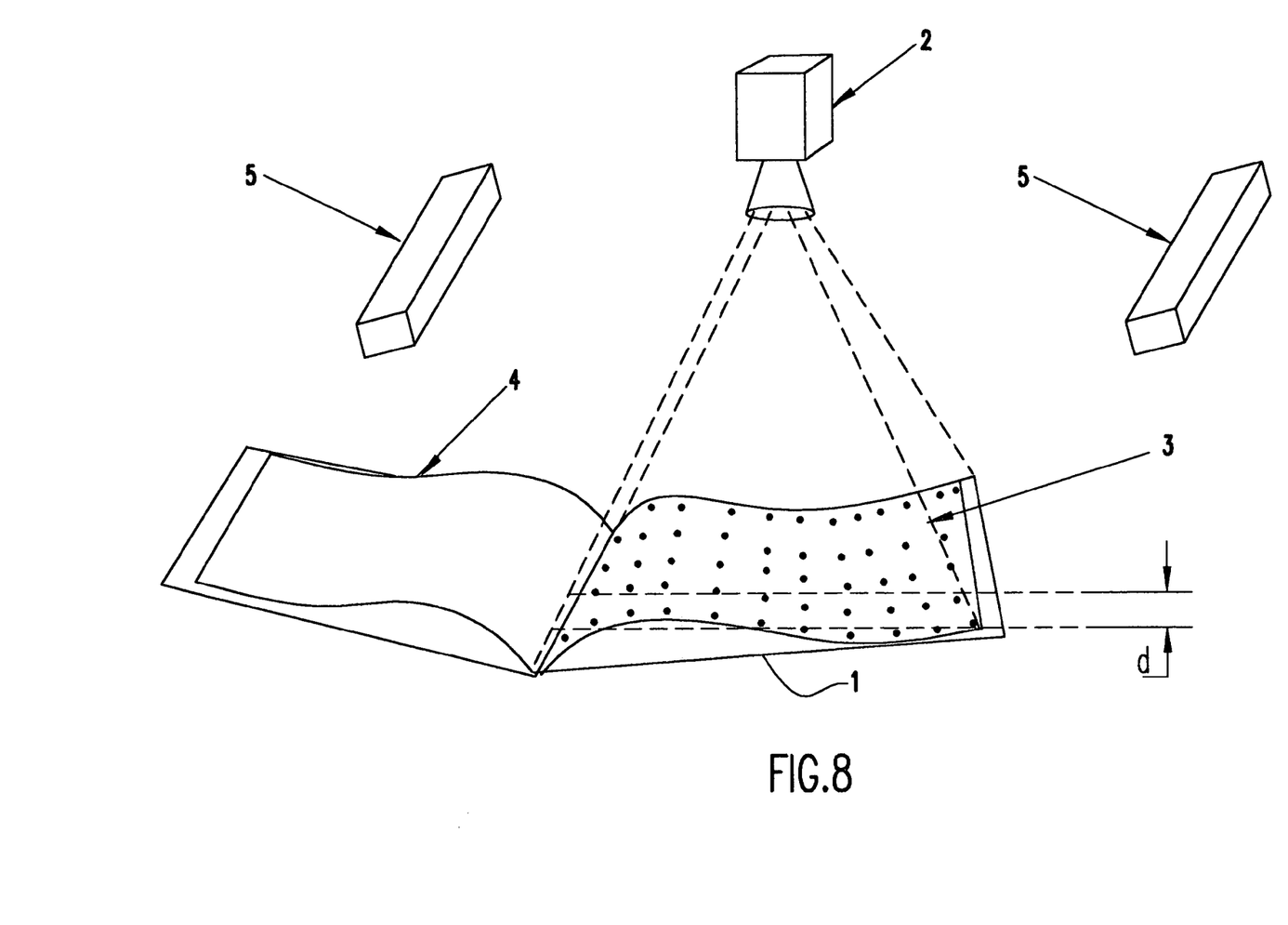
FIG. 8 is a diagram of an optical arrangement in accordance with another embodiment of the invention wherein image from a book are captured by a scanner.

FIG. 8 shows an arrangement for a specific application where images from a book 1 are captured by a scanner 2. In this case, an overlay 3 with black grid points is placed over the intended page. The opposite page is covered with a black overlay 4 to prevent stray reflections from reaching the scanner. The scanner depth of field should be at least enough to capture the curved page correctly. Illumination sources 5 are also provided. After the black grid points are captured, the corresponding splay correction is determined. Then, the overlay with the black grid is removed and the page is scanned and corrected using the computed splay function.

While the invention has been described in terms of the above embodiments, those skilled in the art will recognize that the invention can be practiced with modification within the spirit and scope of the appended claims.

For example, if desired, more than two strips of reference markings may be used to detect and correct distortion.

Also, it is noted that the skewing effects shown in FIG. 1 occur for a scanned image of a page taken from a book having a vertical binding. Those skilled in the art can appreciate that the present method may be used to correct distortion in scanned images of books having a horizontal binding, i.e., one where the pages flip up and down rather from right to left. Correction of distortion in this type of image is also performed by attaching strip 34 so that part of its reference markings lie within the binding area and part outside of this area, although it is possible that the markings may be run up and down rather than from right to left.

Furthermore, instead of requiring the user to attach a strip of reference markings to a page to be scanned, the reference markings can be printed on the pages by the printer or publisher of the document, thereby simplifying the distortion correction method.

We claim:

1. A method for correcting distortion in an image of a scanned document, comprising:
    placing a reference pattern on a page;
    obtaining an image of said page containing printed information at least a portion of which is distorted;
    detecting said reference pattern in the image indicative of the distortion;
    computing an amount of the distortion in said image by analyzing the detected reference pattern; and
    correcting the distortion in said image based on the amount of distortion computed in said computing step,
    wherein said placing step includes:
    attaching a strip of material containing said reference pattern at a predetermined location and predetermined orientation to said page, said obtaining step including scanning said page containing said strip of material into a memory.

2. A method for correcting distortion in an image of a scanned document, comprising:
    placing a reference pattern on a page;
    obtaining an image of said page containing printed information at least a portion of which is distorted;
    detecting said reference pattern in the image indicative of the distortion;

computing an amount of the distortion in said image by analyzing the detected reference pattern; and correcting the distortion in said image based on the amount of distortion computed in said computing step, wherein said placing step includes:

attaching a plurality of strips of material at predetermined locations and predetermined orientations to said page, one of said strips of material containing said reference pattern and another of said strips containing a second reference pattern, said obtaining step including scanning said page containing said plurality of strips of material into a memory.

3. The method of claim 2, wherein said detecting step includes detecting said second reference pattern, wherein said computing step includes computing an amount of distortion in said image by analyzing said reference pattern and said second reference pattern, and wherein said correcting step includes correcting distortion in said image based on the amount of distortion computed in said computing step.

4. A distortion correction processor adapted for use with a digital imaging device, said distortion correction processor comprising:

an optical recognition unit which locates a reference pattern on a page in the form of a strip of material having a predetermined location and predetermined orientation in a document image;

a distortion computation unit which determines an amount of the distortion in said image by analyzing said reference pattern; and a bitmap processor which corrects the distortion in said image based on the amount of distortion computed by the distortion computation unit.

5. The distortion correction processor of claim 4, wherein reference pattern is located at a predetermined position within said image.

6. The distortion correction processor of claim 4, wherein said reference pattern includes a series of markings having a predetermined spatial relationship.

7. The distortion correction processor of claim 6, wherein said series of markings are a series of equidistantly spaced bars.

8. The distortion correction processor of claim 4, wherein said optical recognition unit locates a second reference pattern in said document image at a second location within said image, wherein said distortion computation unit computes an amount of the distortion in said image by analyzing said reference pattern and said second reference pattern, and wherein said bitmap processor corrects distortion in said image based on the amount of distortion computed by said distortion computation unit.

9. A digital imaging system, comprising:

a document having a strip of material containing a reference pattern at a predetermined location and predetermined orientation on a page of said document;

an optical scanner which scans said document to obtain an image, said image containing distortion resulting from curvature of said document on a support surface of said optical scanner;

a distortion correction processor which receives said image from said optical scanner, said distortion correction processor including:

(a) an optical recognition unit which locates said reference pattern in said image, (b) a distortion computation unit which determines an amount of the distortion in said image by analyzing said reference pattern, (c) a bitmap processor which corrects the distortion in said image based on the amount of distortion computed by the distortion computation unit; and an output unit for outputting the corrected image to an output device.

* * * * *